(12) United States Patent
Nakamura et al.

(10) Patent No.: US 7,787,710 B2
(45) Date of Patent: Aug. 31, 2010

(54) IMAGE TRANSFORM APPARATUS AND IMAGE TRANSFORM PROGRAM

(75) Inventors: Yoshiki Nakamura, Yokohama (JP); Hiroshi Furuya, Yokohama (JP)

(73) Assignee: Tokyo Institute of Technology, Tokyo (JP)

( * ) Notice: Subject to any disclaimer, the term of this patent is extended or adjusted under 35 U.S.C. 154(b) by 877 days.

(21) Appl. No.: 11/659,538

(22) PCT Filed: Mar. 6, 2006

(86) PCT No.: PCT/JP2006/304242

§ 371 (c)(1),
(2), (4) Date: Feb. 6, 2007

(87) PCT Pub. No.: WO2006/132014

PCT Pub. Date: Dec. 14, 2006

(65) Prior Publication Data

US 2008/0037892 A1 Feb. 14, 2008

(30) Foreign Application Priority Data

Jun. 6, 2005 (JP) ............................. 2005-165191

(51) Int. Cl.
*G06K 9/54* (2006.01)
(52) U.S. Cl. ........................ 382/302; 382/282; 382/298
(58) Field of Classification Search .................. 382/278, 382/282, 298, 299, 302
See application file for complete search history.

(56) References Cited

U.S. PATENT DOCUMENTS 5,946,417 A * 8/1999 Bonneau et al. ............. 382/236
6,621,605 B1 * 9/2003 Grossetie et al. ............... 359/9

(Continued)

FOREIGN PATENT DOCUMENTS

JP 9-84053 3/1997

(Continued)

OTHER PUBLICATIONS

Nakamura et al., "Prediction of Brightness Using Contrast Profile method—Brightness prediction Based on Luminance Contrast, Part 2", Journal of the Illuminating Engineering Institute of Japan, May 1, 2005, vol. 9, No. 5, pp. 230-235.

(Continued)

*Primary Examiner*—Yosef Kassa
(74) *Attorney, Agent, or Firm*—Squire, Sanders & Dempsey L.L.P.

(57) ABSTRACT

It is an object of the present invention to provide an image transform apparatus and an image transform program which can reduce a computation load for transforming a luminance image to a brightness image. The present invention attains the object by performing wavelet resolution of the luminance image first to generate J pieces (J is an integer equal to two or more) of sub band images, transforming a luminance value of each pixel of the sub band images to a brightness impression value based on a predetermined relation between luminance and brightness impression, and then performing wavelet synthesis of K pieces (K is an integer equal to two or more; $K \leq J$) of sub band images having been subjected to the transformation of the luminance values to the brightness impression values, to generate a brightness image.

8 Claims, 7 Drawing Sheets

U.S. PATENT DOCUMENTS

| | | | |
|---|---|---|---|
| 6,919,892 B1 * | 7/2005 | Cheiky et al. | 345/473 |
| 7,016,545 B1 * | 3/2006 | Schwartz et al. | 382/239 |
| 7,023,447 B2 * | 4/2006 | Luo et al. | 345/582 |

FOREIGN PATENT DOCUMENTS

| | | |
|---|---|---|
| JP | 2002-39859 | 2/2002 |
| JP | 2004-61150 | 2/2004 |

OTHER PUBLICATIONS

Nakamura et al., "Brightness of Circular Object with a Uniform Luminance Background—Brightness prediction Based on Luminance Contrast Part 1", Journal of the Illuminating Engineering Institute of Japan, Feb. 1, 2004, vol. 88, No. 2, pp. 77-84.

Nakamura, "Luminous Intensity and Brightness", Journal of the Illuminating Engineering Institute of Japan, Oct. 1, 2002, vol. 86, No. 10, pp. 746-753.

Fujino et al., "A lighting design system based on brightness predicted from luminance distribution", Architectural Institute of Japan—Summaries of Technical Papers of Annual Meeting, D-1, Jul. 31, 2004, pp. 329-330.

Inoue et al., "Brightness estimation with consideration to Luminance Contrast Part 1", Architectural Institute of Japan—Summaries of Technical Papers of Annual Meeting, D-1, Jul. 31, 2001, pp. 459-460.

Nakamura et al., "Brightness Estimation with consideration to Luminance Contrast Part 2", Architectural Institute of Japan—Summaries of Technical Papers of Annual Meeting, D-1, Jul. 31, 2001, pp. 461-462.

English language translation of: Nakamura, "Luminous Intensity and Brightness", Journal of the Illuminating Engineering Institute of Japan, Oct. 1, 2002, vol. 86, No. 10, pp. 746-753.

English language translation of: Fujino et al., "A lighting design system based on brightness predicted from luminance distribution", Architectural Institute of Japan—Summaries of Technical Papers of Annual Meeting, D-1, Jul. 31, 2004, pp. 329-330.

English language translation of: Inoue et al., "Brightness estimation with consideration to Luminance Contrast Part 1", Architectural Institute of Japan—Summaries of Technical Papers of Annual Meeting, D-1, Jul. 31, 2001, pp. 459-460.

English language translation of: Nakamura et al., "Brightness Estimation with consideration to Luminance Contrast Part 2", Architectural Institute of Japan—Summaries of Technical Papers of Annual Meeting, D-1, Jul. 31, 2001, pp. 461-462.

* cited by examiner

| Level | Images |
|---|---|
| 0 | luminance image |
| -1 | HL(-1), LH(-1), HH(-1) |
| -2 | HL(-2), LH(-2), HH(-2) |
| -3 | HL(-3), LH(-3), HH(-3) |
| -4 | HL(-4), LH(-4), HH(-4) |
| ⋮ | ⋮ |
| -10 | HL(-10), LH(-10), HH(-10) |
| -11 | LL(-11), HL(-11), LH(-11), HH(-11) | wavelet resolution ↓ sub band images (levels -1 through -11)

FIG.5

| Level | Coefficient |
|---|---|
| -1 | 4.128975 |
| -2 | 3.857288 |
| -3 | 3.655009 |
| -4 | 3.313641 |
| -5 | 3.816088 |
| -6 | 3.208502 |
| -7 | 3.050866 |
| -8 | 2.97345 |
| -9 | 2.919884 |
| -10 | 2.436252 |
| -11 | 2.43087 |
| | 1.43064 ← $\beta$ |

$\alpha$ (levels -1 through -11 top value)

FIG.6

| Level | Images |
|---|---|
| 0 | brightness image |
| -1 | HL'(-1), LH'(-1), HH'(-1) |
| -2 | HL'(-2), LH'(-2), HH'(-2) |
| -3 | HL'(-3), LH'(-3), HH'(-3) |
| -4 | HL'(-4), LH'(-4), HH'(-4) |
| : | : |
| -10 | HL'(-10), LH'(-10), HH'(-10) |
| -11 | LL'(-11), HL'(-11), LH'(-11), HH'(-11) | wavelet synthesis ↑ sub band images { levels -1 through -11 }

FIG.7

13 12 11 10 9 8 7 6 5 4 3 2 1 very bright — bright — little bright — not dark and not bright — little dark — dark — very dark

|  | luminance ratio C | | | | |
|---|---|---|---|---|---|
|  | 100 | 10 | 3 | 0.3 | 0.1 |
| object luminance (cd/m2) 3000 | ○ | ○ | ○ |  |  |
| 300 | ○ | ○ | ○ | ○ |  |
| 30 | ○ | ○ | ○ | ○ | ○ |
| 3 |  | ○ | ○ | ○ | ○ |
| 0.3 |  |  |  | ○ | ○ |

FIG.12 ized for designing the luminance condition as a reference image.

IMAGE TRANSFORM APPARATUS AND IMAGE TRANSFORM PROGRAM

CROSS REFERENCE TO RELATED APPLICATION

This application is a US nationalization of International Application PCT/JP20006/304242, filed Mar. 6, 2006 which claims the benefit of priority from Japanese Patent Application No. 2005-165191, filed Jun. 6, 2005.

TECHNICAL FIELD

The present invention relates to an image transform apparatus and an image transform program for designing a luminance condition.

BACKGROUND ART

Conventionally, a lighting condition (that is, luminance distribution in a scene) which is produced depending on the layout and so on of lighting equipments has been simulated. An image with luminance distribution predicted from this lighting simulation is utilized for designing the luminance condition as a reference image.

However, how a person perceives brightness (referred to as "brightness impression" herein) does not directly correspond to values of luminance. For example, when in a luminance image, a peripheral area with lower luminance than an object area is compared with a peripheral area with higher luminance than an object area, the person perceives the former object area as brighter than the latter, even when both the object areas are equal in luminance. Note that the brightness impression is sometimes called brightness perception.

Therefore, predicting accurate luminance distribution by the above lighting simulation and referring to an image with the obtained luminance distribution are not sufficient to study a luminance condition at the time of designing it. This is because brightness impression of an object area changes depending on luminance of a peripheral area even with no change in the luminance of the object area.

In order to study the luminance condition sufficiently, in recent years there has been a demand for quantitative prediction of brightness impression of an object area of a luminance image. The present inventors have proposed a technique to quantitatively predict brightness impression of an object area with high accuracy even in a case where luminance distribution is complicated as in an actual scene (see, for example, a patent document 1). Further, applying this technique extensively makes it possible to transform a luminance image to a brightness image.

Patent document 1 Japanese Unexamined Patent Application Publication No. 2004-61150

DISCLOSURE OF THE INVENTION

Problems to be Solved by the Invention

However, the aforesaid technique has a problem of an enormous computation load for transforming the luminance image to the brightness image, and it needs a long calculation time to obtain the brightness image.

It is an object of the present invention to provide an image transform apparatus and an image transform program which can reduce a computation load for transforming a luminance image to a brightness image.

Means for Solving the Problems

An image transform apparatus of the present invention includes a resolution device which performs wavelet resolution of a luminance image to generate J pieces (J is an integer equal to two or more) of sub band images; a transform device which transforms a luminance value of each pixel of the sub band images to a brightness impression value based on a predetermined relation between luminance and brightness impression; and a synthesis device which performs wavelet synthesis of K pieces (K is an integer equal to two or more; $K \leq J$) of sub band images which have been subjected to the transformation of the luminance values to the brightness impression values by the transform device, to generate a brightness image.

Another image transform apparatus of the present invention includes a resolution device which performs wavelet resolution of a luminance image N times (N is a natural number) to generate (3N+1) pieces of sub band images; a transform device which transforms a luminance value of each pixel of the sub band images to a brightness impression value based on a predetermined relation between luminance and brightness impression; and a synthesis device which performs wavelet synthesis of (3N+1) pieces of sub band images N times to generate a brightness image, the (3N+1) pieces of sub band images having been subjected to the transformation of the luminance values to the brightness impression values by the transform device.

Preferably, the resolution device performs the wavelet resolution using an orthogonal wavelet, and the synthesis device performs the wavelet synthesis using the orthogonal wavelet.

Preferably, the orthogonal wavelet is an approximately symmetrical function.

Preferably, the image transform apparatus includes a second resolution device which performs wavelet resolution of the brightness image generated by the synthesis device to generate J' pieces (J' is an integer equal to two or more) of sub band images; a second transform device which transforms, based on the relation, the brightness impression value of each of the pixels of the sub band images generated by the second resolution device to the luminance value; and a second synthesis device which performs wavelet synthesis of K' pieces (K' is an integer equal to two or more; $K' \leq J'$) of sub band images which have been subjected to the transformation of the brightness impression values to the luminance values by the second transform device, to generate a luminance image.

Preferably, the image transform apparatus includes a second resolution device which performs wavelet resolution of the brightness image generated by the synthesis device N' times (N' is a natural number) to generate (3N'+1) pieces of sub band images; a second transform device which transforms, based on the relation, the brightness impression value of each of the pixels of the sub band images generated by the second resolution device to the luminance value; and a second synthesis device which performs wavelet synthesis of (3N'+1) pieces of sub band images which have been subjected to the transformation of the brightness impression values to the luminance values by the second transform device, to generate a luminance image.

An image transform program of the present invention includes a resolution step of performing wavelet resolution of a luminance image to generate J pieces (J is an integer equal to two or more) of sub band images; a transform step of transforming a luminance value of each pixel of the sub band images to a brightness impression value based on a predetermined relation between luminance and brightness impression; and a synthesis step of performing wavelet synthesis of K pieces (K is an integer equal to two or more; K≦J) of sub band images which have been subjected to the transformation of the luminance values to the brightness impression values by the transform step, to generate a brightness image.

Another image transform program of the present invention causes a computer to execute: a resolution step of performing wavelet resolution of a luminance image N times (N is a natural number) to generate (3N+1) pieces of sub band images; a transform step of transforming a luminance value of each pixel of the sub band images to a brightness impression value based on a predetermined relation between luminance and brightness impression; and a synthesis step of performing wavelet synthesis of (3N+1) pieces of sub band images N times to generate a brightness image, the (3N+1) pieces of sub band images having been subjected to the transformation of the luminance values to the brightness impression values by the transform step.

ADVANTAGEOUS EFFECT OF THE INVENTION

According to the image transform apparatus and the image transform program of the present invention, it is possible to reduce a computation load for transforming a luminance image to a brightness image.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

BEST MODE FOR CARRYING OUT THE INVENTION

Hereinafter, an embodiment of the present invention will be described in detail.

Figure 1:
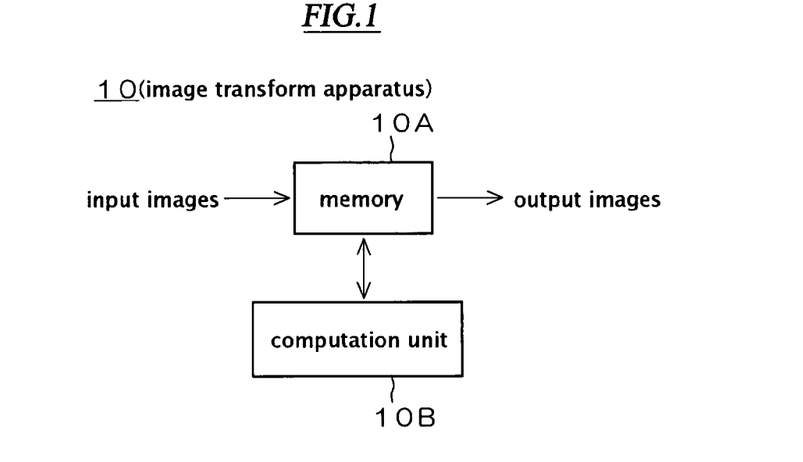
FIG. 1 is a block diagram showing a schematic structure of an image transform apparatus 10 of this embodiment.
Figure 2:
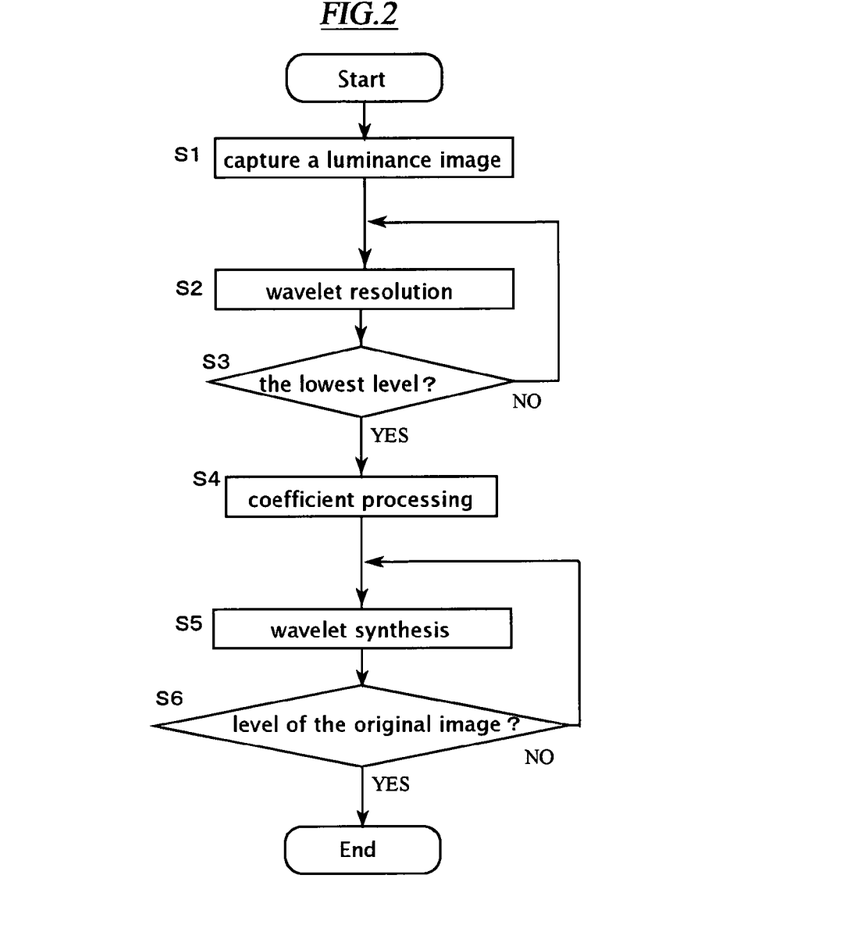
FIG. 2 is a flowchart describing the image transformation step.

An image transform apparatus 10 (FIG. 1) of this embodiment is a computer in which an image transform program is installed, and it includes a memory 10A which stores input images as objects to be processed (for example, luminance images) and output images (for example, brightness images) as processing results; and a computation unit 10B which executes computation processing of image transformation according to the steps of the flowchart shown in FIG. 2. To install the image transform program in the computer, a recording medium (CD-ROM or the like) on which the image transform program is recorded is used. Alternatively, a carrier wave (including the image transform program) downloadable via the Internet may be used.

Figure 3:
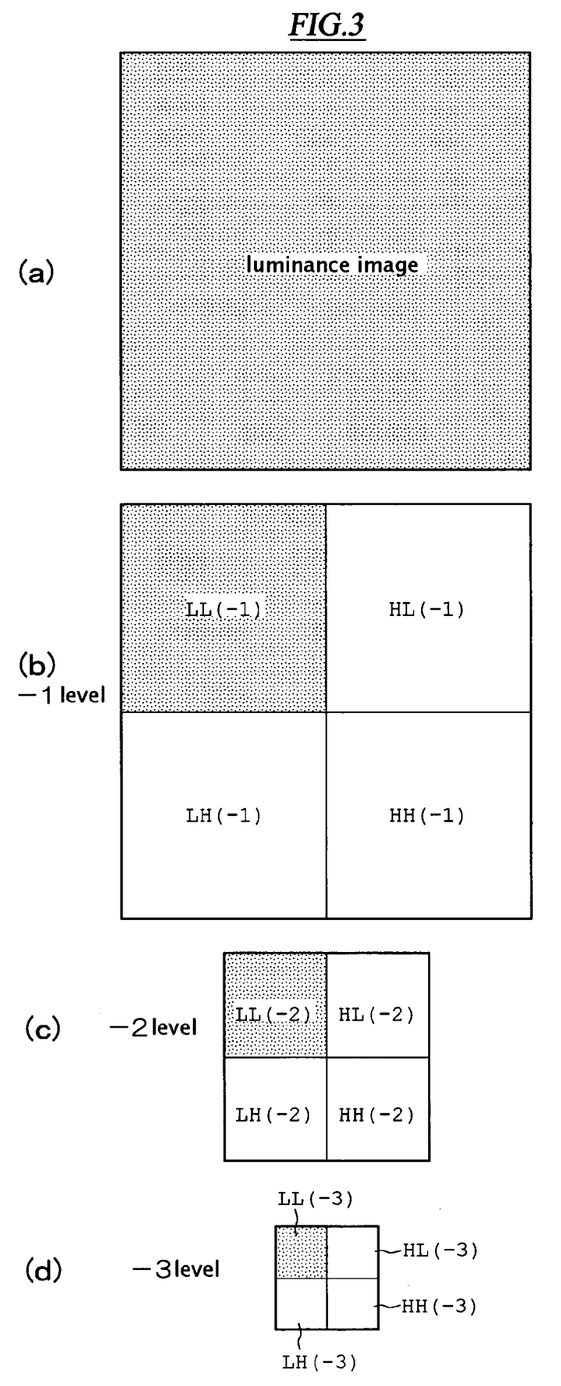
FIG. 3 are views explaining wavelet resolution.

The image transform apparatus 10 captures a luminance image (FIG. 3(a)) into the memory 10A at Step S1 in FIG. 2. The luminance image is a digital image relating to luminance distribution of a scene predicted by arbitrary lighting simulation and represents scene dependency of a luminance real value. The lighting simulation is simulation of a luminance condition which is produced depending on, for example, the layout and the like of lighting equipments in a room. The luminance image can be captured not only through the lighting simulation but also by using a CCD camera.

Next, after calculating a logarithm of each pixel value of the luminance image, the computation unit 10B of the image transform apparatus 10 proceeds to processing at Step S2. At Step S2, wavelet resolution of the luminance image (logarithmic image) is performed by using an orthogonal wavelet (for example, symlet6), whereby four sub band images LL(−1), HL(−1), LH(−1), HH(−1) at −1 level shown in FIG. 3(b) are generated. The sub band image LL(−1) is a low-frequency component extracted from a luminance change in the luminance image, and can be considered as an approximate image of the luminance image. The other sub band images HL(−1), LH(−1), HH(−1) are a high-frequency component in a vertical direction, a high-frequency component in a horizontal direction, and a high-frequency component in an oblique direction, respectively, extracted from the luminance change in the luminance image. The number of pixels in each of the sub band images LL(−1), HL(−1), LH(−1), HH(−1) is ¼ of the number of pixels of the luminance image.

Next (Step S3), the image transform apparatus 10 determines whether or not the level of the aforesaid wavelet resolution has reached the lowest level, and if the lowest level has not been reached, it returns to the processing at Step S2 to repeat the wavelet resolution while lowering the level in decrements of one level. In this embodiment, the lowest level is, for example, −11 level. In this case, the processing at Step S2 (wavelet resolution) is repeated 11 times.

The second wavelet resolution is wavelet resolution from the −1 level to −2 level and is performed on the sub band image LL(−1) which is the low-frequency component at the −1 level. As a result, four sub band images LL(−2), HL(−2), LH(−2), HH(−2) at the −2 level shown in FIG. 3(c) are generated. The sub band image LL(−2) is a low-frequency component extracted from a luminance change in the sub band image LL(−1) and can be considered as an approximate image of the luminance image similarly to the sub band image LL(−1). The other sub band images HL(−2), LH(−2), HH(−2) are a high-frequency component in the vertical direction, a high-frequency component in the horizontal direction, and a high-frequency component in the oblique direction, respectively, extracted from the luminance change in the sub band image LL(−1).

As compared with the first wavelet resolution (FIG. 3(a)→(b)), the second wavelet resolution (FIG. 3(b)→(c)) can extract a lower-frequency (rougher) luminance change. Similarly, in the wavelet resolutions at and after the third time, four sub band images LL(−3), HL(−3), LH(−3), HH(−3) at −3 level are generated from the sub band image LL(–2) which is a low-frequency component at the –2 level (FIG. 3(d)), and each time the level is lowered, a rougher luminance change is extracted. Then, when four sub band images LL(–11), HL(–11), LH(–11), HH(–11) at the –11 level are generated, the image transform apparatus 10 proceeds to the next Step S4.

Figure 4:
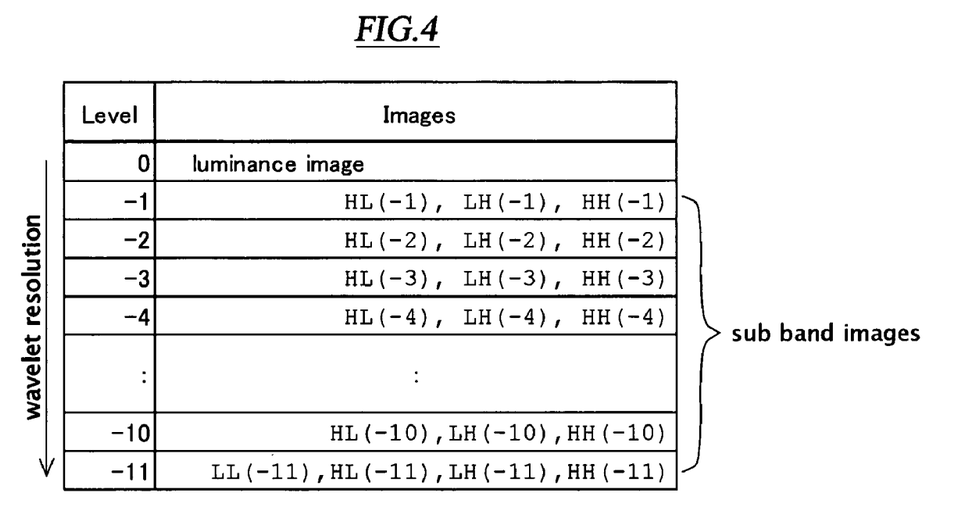
FIG. 4 is an explanatory chart of sub band images generated by the wavelet resolution.

At this instant, the wavelet resolution has been repeated eleven times, and 34 sub band images HL(–1), LH(–1), HH(–1), HL(–2), LH(–2), HH(–2), ..., LL(–11), HL(–11), LH(–11) HH(–11) shown in FIG. 4 have been generated to be stored in the memory 10A of the image transform apparatus 10.

Figure 5:
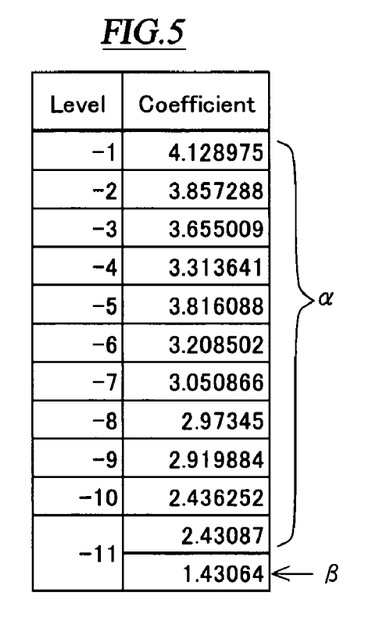
FIG. 5 shows an example of coefficients representing the relation between luminance and brightness impression.

Next (Step S4), the computation unit 10B of the image transform apparatus 10 performs the following coefficient processing based on a predetermined relation between luminance and brightness impression (for example, coefficients $\alpha(-1), \alpha(-2), \ldots, \alpha(-11), \beta(-11)$ for the respective levels shown in FIG. 5) to transform a value of luminance of each pixel of the sub band images HL(–1), LH(–1), HH(–1), HL(–2), LH(–2), HH(–2), ... LL(–11), HL(–11), LH(–11), HH(–11) to a value of brightness impression.

Concretely, according to the following equation (1) using the coefficient $\alpha(-11)$ for the –11 level, pixel values (values of luminance) of the sub band image LL(–11) which is a low-frequency component at the –11 level are transformed to the values of brightness impression (pixel values of a sub band image LL'(–11)).

$$\text{pixel value of } LL'(-11) = \beta(-11) \times (\text{pixel value of } LL(-11)) + 4.653435 \quad (1)$$

The sub band image LL'(–11) corresponds to a low-frequency component at the –11 level of a brightness image which is to be finally obtained.

Further, according to the following equations (2)~(4) using the coefficient $\alpha$ for –N level (N=1~11), pixel values (values of luminance) of the sub band images HL(–N), LH(–N), HH(–N) which are high-frequency components at the –N level are transformed to values of brightness impression (pixel values of sub band images HL'(–N), LH'(–N), HH'(–N)). The sub band images HL'(–N), LH'(–N), HH'(–N) correspond to high-frequency components at the –N level of the brightness image which is to be finally obtained.

$$\text{pixel value of } HL'(-N) = \alpha(-N) \times (\text{pixel value of } HL(-N)) \quad (2)$$

$$\text{Pixel value of } LH'(-N) = \alpha(-N) \times (\text{pixel value of } LH(-N)) \quad (3)$$

$$\text{pixel value of } HH'(-N) = \alpha(-N) \times (\text{pixel value of } HH(-N)) \quad (4)$$

The coefficient processing (Step 54) based on the equations (1)~(4) as described above is processing to add an effect which is given to the brightness impression by the luminance change with various frequencies extracted from the original luminance image (that is, the coefficients $\alpha(-1), \alpha(-2), \ldots, \alpha(-11), \beta(-11)$).

Figure 6:
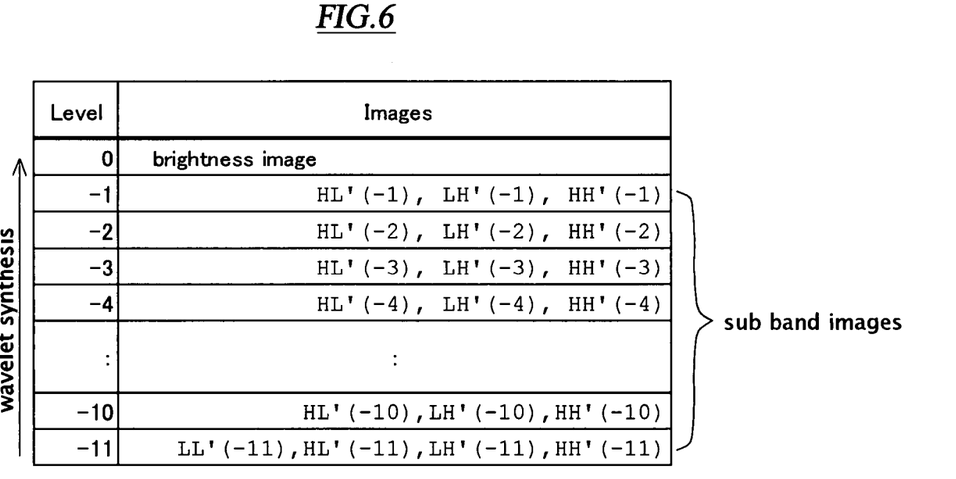
FIG. 6 is an explanatory chart of sub band images which have undergone coefficient processing.

As a result, sub band images HL'(–1), LH'(–1), HH'(–1), ..., LL'(–1), HL'(–11), LH'(–11), HH'(–11) shown in FIG. 6 are stored in the memory 10A of the image transform apparatus 10. Note that the pixel values (values of the brightness impression) of the sub band image LL'(–11) correspond to brightness impression (Bu) when luminance is uniform. The pixel values of the sub band images HL'(–N), LH'(–N), HH'(–N) (values of the brightness impression) correspond to brightness impression (Bc) by the contrast effect of luminance. How the coefficients $\alpha(-1), \alpha(-2), \ldots, \alpha(-11), \beta(-11)$ are decided will be described finally.

Next (Step S5), the computation unit 10B of the image transform apparatus 10 performs wavelet synthesis of the four sub band images LL'(–11), HL'(–11), LH'(–11), HH'(–11) at the –11 level shown in FIG. 6 by using the same orthogonal wavelet (for example, symlet6) as that used at Step S2. A sub band image LL'(–10) which is a low-frequency component at one level higher (–10) can be generated by this wavelet synthesis.

Next (Step S6), it is determined whether or not the level of the aforesaid wavelet synthesis has reached the level of the original image (here, the luminance image in FIG. 3(a)), and if the level of the original image has not been reached, the image transform apparatus 10 returns to the processing at Step S5 to repeat the wavelet synthesis while raising the level in increments of one level. In this embodiment, since the lowest level is the –11 level, the processing at Step S5 (wavelet synthesis) is repeated eleven times.

The second wavelet synthesis is wavelet synthesis from the –10 level to –9 level and is performed by using the sub band image LL'(–10) generated by the first wavelet synthesis and the three sub band images HL'(–10), LH'(–10), HH'(–10) at the –10 level shown in FIG. 6. As a result, a sub band image LL'(–9) which is a low-frequency component at one level higher (the –9 level) can be generated.

The wavelet syntheses at and after the third time are also performed in the same manner, and when a sub band image (that is, a brightness image) which is a low-frequency component of the level of the original image (0 level) is generated based on a sub band image LL'(–1) at the –1 level generated by the tenth wavelet synthesis and the three sub band images HL'(–1), LH'(–1), HH'(–1) at the –1 level shown in FIG. 6, the image transform apparatus 10 finishes the computation processing of the image transform in FIG. 2.

Figure 7:
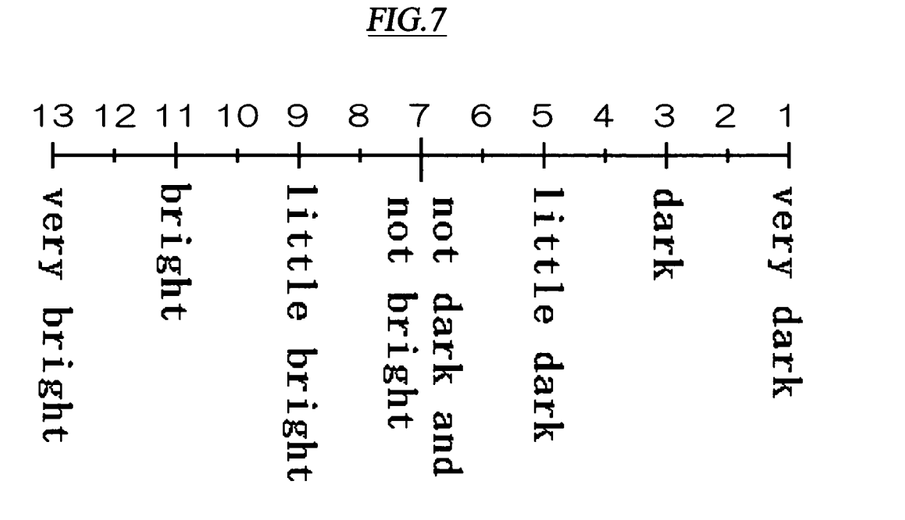
FIG. 7 is an explanatory chart of a rating scale of brightness impression.

Pixel values (values of brightness impression) of the brightness image thus generated as a result of the transform of the luminance image (FIG. 3(a)) are obtained as numerical values (1~13) of a rating scale shown in FIG. 7. Therefore, by knowing adjectives (very dark~very bright) corresponding to the pixel values (1~13) of the brightness image, it is possible to find "the brightness impression" adapted to human perception. In the rating scale in FIG. 7, the numerical values (1~13) are allotted to the adjectives (very dark~very bright) of the brightness impression generally used in a field of the design of a luminance condition, for convenience sake.

(Accuracy Evaluation)

In order to evaluate accuracy of the transform by the image transform apparatus 10 of this embodiment, pixel values (predicted values) of the brightness image resulting from the transform from the luminance image (FIG. 3(a)) are compared with measured values obtained from subjects in a later-described experiment.

Figure 8:
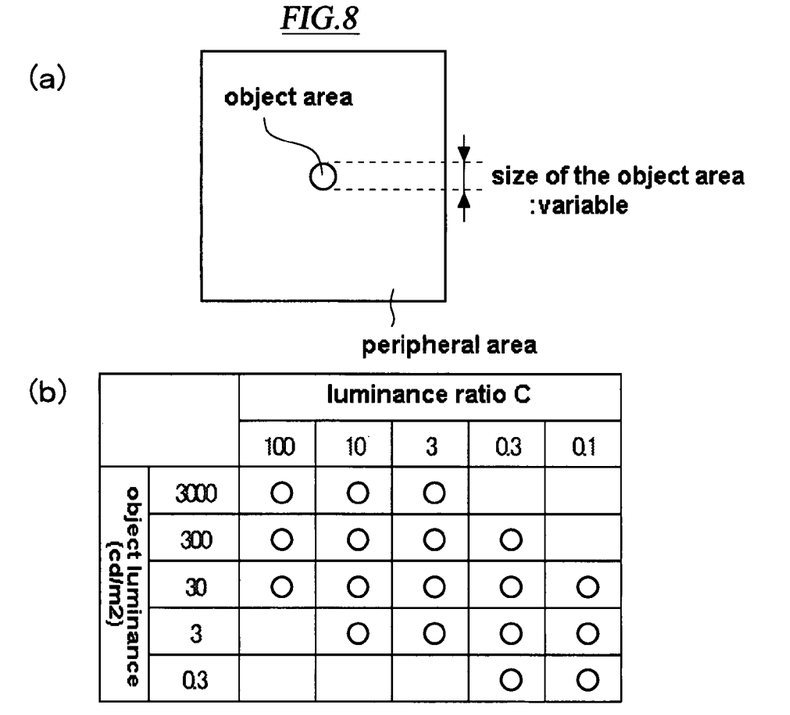
FIG. 8 are charts describing patterns used in accuracy evaluation.

A pattern prepared as a luminance image for evaluation has two areas (an object area, a peripheral area) different in luminance as shown in FIG. 8(a) and the size of the object area is variable (visual angle 0.1°, 0.5°, 1°, 2°, 5°, 10°, 15°, 20°, 30°, 60°, 180°). Further, the combination of luminance [cd/m$^2$] of the object area and a luminance ratio C (=object luminance/periphery luminance) between the object area and the peripheral area is changed as shown in FIG. 8(b). Then, these patterns are used for the evaluation.

Predicted values of the brightness impression of the object areas of the respective patterns are found by the image transform apparatus 10 according to the above-described steps of the flowchart shown in FIG. 2.

Figure 9:
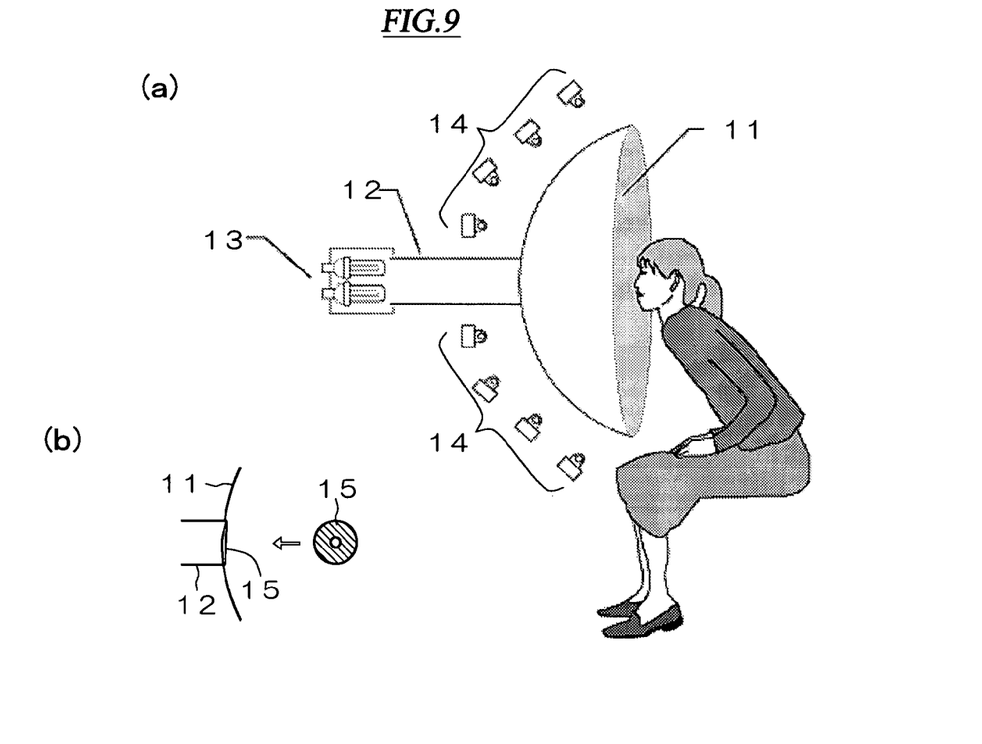
FIG. 9 are schematic views showing the structure of an experimental apparatus used to measure brightness impression.

An experimental apparatus shown in FIGS. 9(a), (b) is used to measure the brightness impression of the object area of each of the patterns. As shown in FIG. 9(a), the experimental apparatus includes: an opaque white panel 11 covering a 180° visual angle; a cylinder 12 of black paper attached to the panel 11 from a center portion to an outer side of the panel 11; a neutral white fluorescent lamp 13 attached to a tip portion of the cylinder 12; a film 15 attached to the other end (panel 11 side) of the cylinder 12; and a large number of fluorescent lamps 14 provided along the whole outer side of the panel 11.

The brightness impression was measured by using this experimental apparatus in a room light-shielded by a blackout curtain while the luminance of the peripheral area is adjusted by light intensity of the fluorescent lights 14, the luminance of the object area is adjusted by light intensity of the fluorescent lamp 13, and the size of the object area was adjusted. Further, the luminance of the peripheral area near the object area was adjusted by changing transmittance of the film 15. The subjects were totally nine men and women in their 20's whose twenty-twenty vision including corrected vision by eyeglasses or the like was 1.0 or more. The actual measurement was repeated twice or three times (/one subject) for each of the patterns so as to obtain stable rating. The patterns of various kinds were presented at random to the subjects.

Further, in the measurement of the brightness impression by using this experimental apparatus, each of the subjects selects one from the numerical values (1~13) of the rating scale in FIG. 7 as brightness impression of the object area of each of the presented patterns according to how he/she perceives. The numerical values of the rating scale selected by the respective subjects are averaged for each of the patterns, and the obtained average values are defined as the "measured values".

Figure 10:
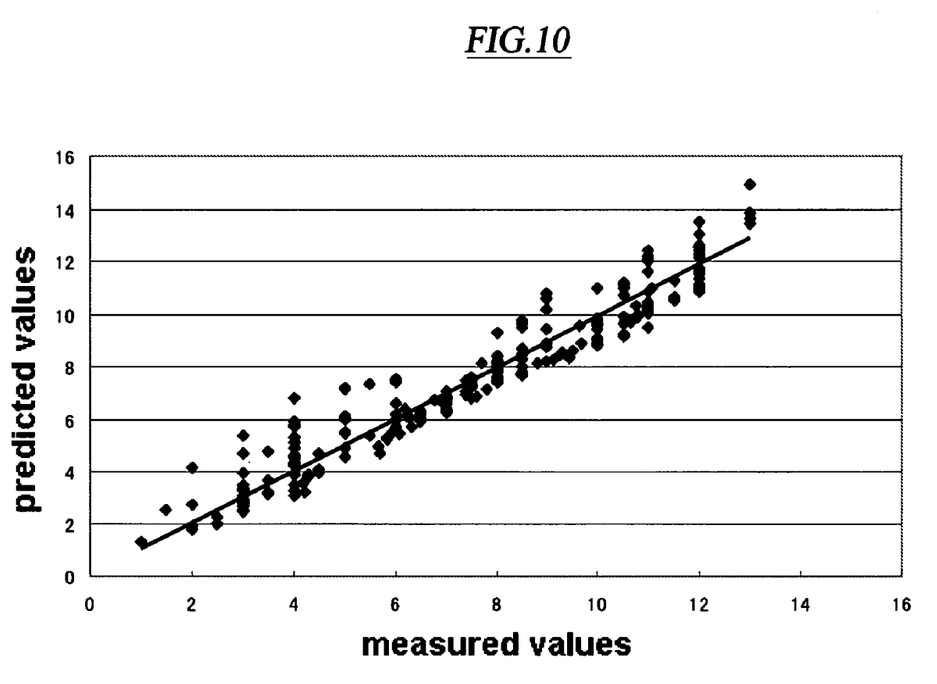
FIG. 10 is a chart showing accuracy of prediction of brightness impression when the patterns in FIG. 8 are used.
Figure 11:
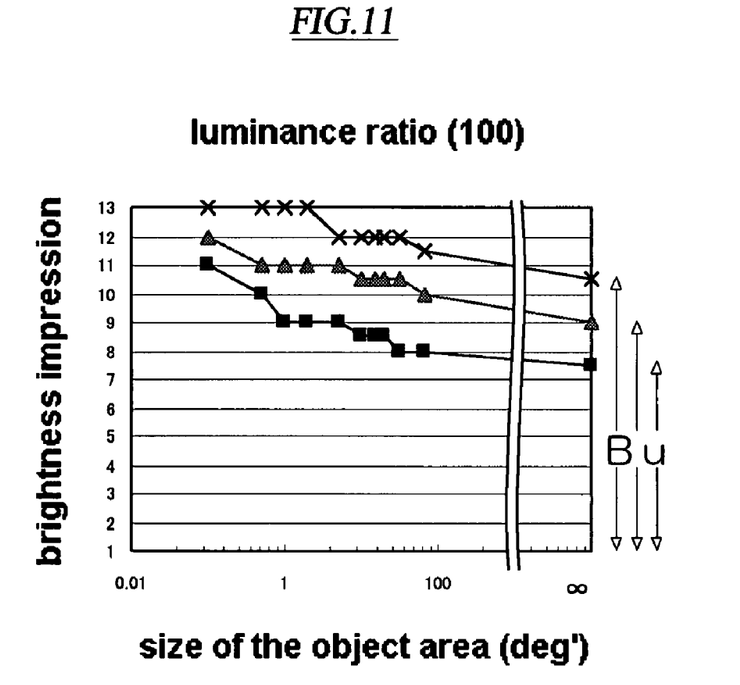
FIG. 11 is an explanatory chart of changes in brightness impression (measured values) depending on the size of an object area.
Figure 12:
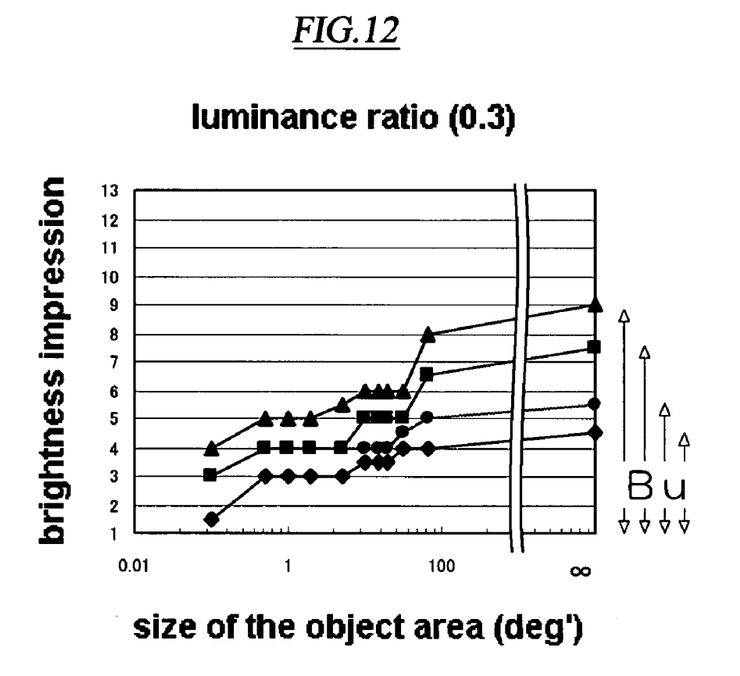
FIG. 12 is an explanatory chart of changes in brightness impression (measured values) depending on the size of the object area.

The comparison between the predicted values and the measured values of the brightness impression for the respective patterns obtained as described above are shown in FIG. 10. In FIG. 10, the horizontal axis shows the measured value and the vertical axis shows the predicted value. As is seen from FIG. 10, points (♦) each representing the combination of the measured value and the predicted value of each of the patterns mostly concentrate on a 45° line. Errors are within about ±1 in terms of the rating scale. Further, the R2 value shows full explanatory power of 92% (R=0.959582).

From the above result, it can be said that the accuracy of the computation processing (FIG. 2) of the image transform in the image transform apparatus 10 of this embodiment is sufficiently high. That is, according to the image transform apparatus 10 of this embodiment, it is possible to quantitatively predict brightness impression of an object area in a luminance image with high accuracy even in a case where luminance distribution is complicated.

Further, according to the image transform apparatus 10 of this embodiment, since the luminance image is transformed to the brightness image by the combination of the wavelet resolution at Step S2 and the wavelet synthesis at Step S5 in FIG. 2 (that is, by applying stationary wavelet transform), a computation load of this transform can be reduced. Therefore, it is possible to obtain the brightness image from the luminance image in a far shorter time and at higher speed than in a conventional art.

Further, according to the image transform apparatus 10 of this embodiment, since the orthogonal wavelet is used for the wavelet resolution and the wavelet synthesis (Steps S2, S5 in FIG. 2), it is possible to greatly reduce an error in the computation processing of the image transformation. Therefore, by performing inverse transformation from the brightness image to the luminance image by using the same orthogonal wavelet after the above-described transform from the luminance image to the brightness image, it is possible to restore the original luminance image. That is, according to the image transform apparatus 10, high-speed bi-directional transform to/from the luminance image from/to the brightness image is enabled.

Here, the inverse transformation from the brightness image to the luminance image will be described. Processing of this inverse transformation is processing in which, in the description of the above transform processing (FIG. 2 to FIG. 6), the brightness image is substituted for the luminance image and the luminance image is substituted for the brightness image, and the following equations (5)~(8) are used as bases of the coefficient processing at Step S4 in FIG. 2. LL'(−N), HL'(−N), LH'(−N), HH'(−N) are sub band images at the −N level of the brightness image. LL(−N), HL(−N), LH(−N), HH(−N) are sub band images at the −N level of the luminance image.

$$\text{pixel value of } LL(-11) = \{(\text{pixel value of } LL'(-11)) - 4.653435\} \div \beta(-11) \quad (5)$$

$$\text{pixel value of } HL(-N) = (\text{pixel value of } HL'(-N)) \div \alpha(-N) \quad (6)$$

$$\text{pixel value of } LH(-N) = (\text{pixel value of } LH'(-N)) \div \alpha(-N) \quad (7)$$

$$\text{pixel value of } HH(-N) = (\text{pixel value of } HH'(-N)) \div \alpha(-N) \quad (8)$$

This coefficient processing based on the equations (5)~(8) is also processing to add the effect given to the brightness impression by the brightness change with various frequencies (that is, $\alpha(-1), \alpha(-2), \ldots, \alpha(-11), \beta(-11)$).

The sub band images LL'(−1), ... generated by the wavelet resolution are low-frequency components or high-frequency components extracted from the brightness change in the brightness image. The pixel values of the sub band image LL(−11) correspond to uniform luminance. The pixel values (values of luminance) of the sub band images HL(−N), LH(−N), HH(−N) correspond to the contrast effect of luminance.

The inverse transformation processing as described above may be applied to a brightness image which is generated in advance by transforming the luminance image, or may be applied to a brightness image newly generated by some method. In the former case, it is preferable to use the same orthogonal wavelet as that used when the luminance image is changed to the brightness image. Further, at the time of the inverse transformation from the brightness image to the luminance image, each pixel of the luminance image at an instant when the wavelet synthesis is finished presents a logarithmic value. Therefore, it is preferable to perform calculation for returning each of the pixel values to a real value and define the resultant image as the final luminance image.

In the image transform apparatus 10 of this embodiment, it is possible to generate the brightness image by transforming the pixel values (values of luminance) of the sub band images to the values of the brightness impression according to the equations (1)~(4) when the wavelet resolution of the luminance image is performed and by performing the wavelet synthesis of the sub band images resulting from the transform. Further, it is possible to generate the luminance image by transforming the pixel values (values of the brightness impression) of the sub band images according to the equations (5)~(8) when the wavelet resolution of the brightness image is performed and by performing the wavelet synthesis of the sub band images resulting from the transform.

Further, in the image transform apparatus 10 of this embodiment, since the bi-directional transform to/from the luminance image from/to the brightness image as described above can be performed at high speed, it is possible to efficiently realize lighting design, lighting control, and the like as follows.

Conventional lighting design is lighting design using illuminance and can ensure easy view of characters and so on written on paper, but it can hardly cope with the design of lighting for producing some atmosphere in a room, wall lighting in an open ceiling space, illumination for lighting up, and the like (brightness distribution produced by light). On the other hand, according to this embodiment, it is possible to obtain a physical quantity (luminance) of illumination realizing the above design while directly adjusting the pixel values (brightness impression) of the brightness image. Therefore, a designer can design output, light intensity distribution, positions, and so on of lighting equipments as desired. In this case, it is conceivable to install the computation processing of the image transformation (bi-directional transform) in CG generating software.

Further, in recent years, introducing natural light into a room has been considered in various fields in view of energy saving. At this time, light intensity of artificial lighting needs to be adjusted according to the introduction of the natural light. Conventionally, since a degree of the introduction of the natural light has been measured by an illuminometer, it has been difficult to appropriately adjust the light intensity of artificial lighting. However, according to this embodiment, it is possible to capture a luminance image in real time by using a CCD camera and transform the luminance image to a brightness image (image directly expressing how a person perceives), and therefore, adjusting the artificial lighting according to the pixel values (values of the brightness impression) of the brightness image can realize an optimum luminance condition produced by the combination of the natural light and the artificial lighting. In this case, it is conceivable to install the computation processing of the image transformation (bi-directional transformation) in a control system for the utilization of the natural light.

Further, the same control system is also usable not only for the above-described adjustment of the artificial lighting but also for the adjustment of the inclination of a window blind, the output adjustment of monitor devices of various apparatuses, the output adjustment of a PC projector, and the like.

Further, according to the image transform apparatus 10 of this embodiment, since the approximately symmetrical function (for example, symlet6) is used as the orthogonal wavelet at the time of the wavelet resolution of the luminance image and the brightness image and at the time of the wavelet synthesis (Steps S2, S5 in FIG. 2), the transform appropriate for a characteristic of the brightness impression of human eyes (characteristic that a contrast effect of the brightness impression is symmetrical with respect to the center of a field of view and does not have directivity) is enabled.

(Supplement)

Finally, how the coefficients $\alpha(-1)$, $\alpha(-2)$, ..., $\alpha(-11)$, $\beta(-11)$ in FIG. 5 are decided will be described.

Patterns prepared as luminance images for this purpose are the same as those in FIGS. 8(a), (b) described above.

FIG. 11 and FIG. 12 show measured values of the brightness impression of the respective patterns, for example, in a case where a luminance ratio is 100 and those in a case where a luminance ratio is 0.3. In FIG. 11 and FIG. 12, the horizontal axis is a logarithmic axis showing the size (deg') of an object area and the vertical axis shows the measured value of the brightness impression. In FIG. 11 and FIG. 12, "x", "▲", "■", "●", "♦" correspond to measured values when the luminance of the object area is 3000, 300, 30, 3, 0.3 [cd/m$^2$] respectively.

As is seen from FIG. 11, in the case where the luminance ratio>1 (the object area has higher luminance), the brightness impression presents a decreasing tendency as the object area increases in size. On the other hand, as is seen from FIG. 12, in the case where the luminance ratio<1 (the object area has lower luminance), the reverse tendency is observed and the brightness impression increases as the object area increases in size.

Further, that the size of the object area is "∝" corresponds to that the visual angle of the object area of each of the patterns is 180°. That is, it means a state where object luminance distributes uniformly all over a 180° field of view. Therefore, the measured values when the size of the object area is "∝" correspond to the brightness impression (Bu) when luminance is uniform.

Further, brightness impression (Bc) by a contrast effect of luminance can be thought to correspond to a difference between the measured value when the size of the object area is "∝" (see Bu in FIG. 11 and FIG. 12) and the measured value when the size is limited. As shown in FIG. 11, in the case where the luminance ratio>1 (the object area has higher luminance), the brightness impression Bc by the contrast effect of luminance has a "plus" value, and as shown in FIG. 12, in the case where the luminance ratio<1 (the object area has lower brightness), the brightness impression Bc by the contrast effect of luminance has a "minus" value.

Therefore, by using the measured values of the brightness impression of the respective patterns (FIG. 11, FIG. 12) to perform multi regression analysis of the measured values on assumption that symlet6 is used as the orthogonal wavelet and also on assumption that resolution (visual angle per one pixel) of the luminance image is about 0.1°, it is possible to decide values of the coefficients $\alpha(-1)$, $\alpha(-2)$, ..., $\alpha(-11)$, $\beta(-11)$ in FIG. 5. It is also possible to decide the value (4.653435) of the constant terms in the equations (1), (5).

Modified Examples

In the above-described embodiment, symlet6 is used as the orthogonal wavelet, for instance, but the present invention is not limited to this. It is also possible to perform the same calculation by using any other approximately symmetrical function (for example, symlet4, 8 or the like). However, in a case where a function other than symlet6 is used, values different from the values in FIG. 5 and the equations (1), (5) need to be newly found as coefficients representing the relation between luminance and brightness impression.

Further, in the above-described embodiment, the same orthogonal wavelet is used at the time of the transform from the luminance image to the brightness image and at the time of the inverse transformation from the brightness image to the luminance image, but different orthogonal wavelets may be used. In this case, since appropriate coefficients (relation between luminance and brightness impression) exist for each of the orthogonal wavelets, it is necessary to find the appropriate coefficients by the above-described method and use them for the computation processing of the image transform.

The above-described embodiment uses the orthogonal wavelet, but the present invention is also applicable to a case where a nonorthogonal wavelet is used. In this case, since functions are not independent, approximation calculation is required for the wavelet synthesis.

However, with use of a completely restorable wavelet obtained by appropriately combining a wavelet for the resolution and a wavelet for the synthesis (that is, a biorthogonal wavelet), the approximation calculation is not required even when the wavelets of the resolution/synthesis are nonorthogonal. Therefore, with the use of the biorthogonal wavelet, it is also possible to greatly reduce an error in the computation processing of the image transformation and to perform the bi-directional transform to/from the luminance image from/to the brightness image at high speed, similarly to the above-described case where the orthogonal wavelet is used. Thus, the present invention is effective and can provide the same effects not only in the case where each of the wavelets of the resolution/synthesis is orthogonal but also in the case where the combination of the both wavelets is orthogonal (biorthogonal).

In the above-described embodiment, the wavelet resolution is performed up to the −11 level, but the present invention is not limited thereto. The lowest level may be set according to required accuracy of the image transformation. Further, in a case where the size of an original image (for example, a luminance image) is small and a sub band image has one pixel at a stage before the level reaches the −11 level, the wavelet resolution may be finished at this instant. In any case, in a case where the lowest level at which the wavelet resolution is finished is different from the −11 level, the following equations (9), (10) are calculated instead of the calculation of the equations (1), (5), for each pixel of the sub band image (LL) which is a low-frequency component at the lowest level. In the equations (9), (10), −M level is the lowest level.

$$\text{pixel value of } LL'(-M) = \beta(-M) \times (\text{pixel value of } LL(-M)) + 4.653435 \quad (9)$$

$$\text{pixel value of } LL(-M) = \{(\text{pixel value of } LL'(-M)) - 4.653435\} \div \beta(-M) \quad (10)$$

The wavelet resolution may be continued even after the sub band image has one pixel to be finished at an instant when the level reaches the −11 level. In the coefficient processing in this case, the aforesaid equations (1)~(8) are used.

Further, the values of the coefficients $\alpha(-1)$, $\alpha(-2)$, ..., $\alpha(-11)$, $\beta(-11)$ representing the relation between luminance and brightness impression and the values of the constant terms in the equations (1), (5) are preferably found for each kind of the orthogonal wavelets, and in addition, in a case where resolution of an original image (for example, a luminance image) is changed, they are preferably found for each resolution.

Further, the above embodiment has described the example where the image transform apparatus 10 is a computer in which the image transform program is installed, but the present invention is not limited to this. The image transform apparatus 10 may be structured as a chip by dedicated hardware (LSI). By structuring the image transform apparatus 10 as a chip, lighting control and so on can be made real-time control.

In the above-described embodiment, at the time of the transform from the luminance image to the brightness image, the wavelet resolution is performed after the logarithmic values of the pixel values (real values) of the luminance image are calculated, and at the time of the inverse transformation from the brightness image to the luminance image, the final luminance image is generated by calculating the real values of the pixel values (logarithmic values) of the luminance image immediately after the wavelet synthesis, but the present invention is not limited to this. The calculation of the logarithms as described above is calculation in which nonlinearity of a visual system is taken into consideration, and the same effect can be also obtained when a power function such as, for example, ⅓ power is used other than the logarithms. The power function may be set according to the expression of a uniform perception space.

In the above-described embodiment, the results of a psychological rating experiment based on the absolute scale are used for the brightness perception, but threshold values (borderline values above and below which a difference is recognizable and not recognizable) or the like may be used for the scale.

In the above-described embodiment, the resolution of an image is set to about 0.1°, but the present invention is not limited to this. The resolution may be set to any value (for example, higher resolution) other than 0.1°. However, in a case where the setting of the resolution is changed, it is necessary to find, for each resolution, the correspondence relation (coefficients) with the perception scale.

In the above-described embodiment, the wavelet resolution is repeated N times (N is a natural number), the (3N+1) pieces of sub band images are generated by N times of the wavelet resolution, thereafter, all of these sub band images are subjected to the coefficient processing, and the wavelet synthesis (N times) of all the (3N+1) pieces of sub band images having undergone the processing is performed, but the present invention is not limited to this. Sub band images in an arbitrary plural number smaller than (3N+1) out of the sub band images having undergone the coefficient processing may be used for the wavelet synthesis. However, using all the sub band images having undergone the coefficient processing for the wavelet synthesis enables more accurate transform, and enables the bi-directional transform to/from the luminance image from/to the brightness image.

In the above-described embodiment, four sub band images are generated by one wavelet resolution, but the present invention is not limited to this. The present invention is applicable to any case where the number of sub band images generated by one wavelet resolution is two or more. Similarly, a sub band image at one level higher is generated from four sub band images by one wavelet synthesis, but a sub band image at a higher level may be generated from two sub band images or more.

In the above-described embodiment, the numbers of times the wavelet resolution is performed at the time of the bi-directional transform to/from the luminance image from/to the brightness image are set equal to each other (for example, 11 times), but the present invention is not limited to this. The number of times the wavelet resolution is performed at the time of the transform from the luminance image to the brightness image and the number of times the wavelet resolution is performed at the time of the inverse transformation from the brightness image to the luminance image may be set different.

The invention is not limited to the above embodiments and various modifications may be made without departing from the spirit and scope of the invention. Any improvement may be made in part or all of the components.

What is claimed is:

1. An image transform apparatus comprising:
   a resolution device which performs wavelet resolution of a luminance image to generate J pieces of sub band images, the J being an integer equal to two or more;
   a transform device which transforms a luminance value of each pixel of said sub band images to a brightness impression value based on a predetermined relation between luminance and brightness impression; and
   a synthesis device which performs wavelet synthesis of K pieces of sub band images which have been subjected to the transformation of the luminance values to the brightness impression values by said transform device, to generate a brightness image, the K being an integer equal to two or more; K≦J.

2. An image transform apparatus comprising:
   a resolution device which performs wavelet resolution of a luminance image N times to generate (3N+1) pieces of sub band images, the N being a natural number;

a transform device which transforms a luminance value of each pixel of said sub band images to a brightness impression value based on a predetermined relation between luminance and brightness impression; and a synthesis device which performs wavelet synthesis of (3N+1) pieces of sub band images N times to generate a brightness image, the (3N+1) pieces of sub band images having been subjected to the transformation of the luminance values to the brightness impression values by said transform device.

3. The image transform apparatus according to claim 2, wherein:

said resolution device performs the wavelet resolution, using an orthogonal wavelet; and said synthesis device performs the wavelet synthesis, using the orthogonal wavelet.

4. The image transform apparatus according to claim 3, wherein the orthogonal wavelet is an approximately symmetrical function.

5. The image transform apparatus according to claim 3, comprising:

a second resolution device which performs wavelet resolution of the brightness image generated by said synthesis device, to generate J' pieces of sub band images, the J' being an integer equal to two or more;

a second transform device which transforms, based on said relation, the brightness impression value of each of the pixels of said sub band images generated by said second resolution device to the luminance value; and a second synthesis device which performs wavelet synthesis of K' pieces of sub band images which have been subjected to the transformation of the brightness impression values to the luminance values by said second transform device, to generate a luminance image, the K' being an integer equal to two or more; $K' \leq J'$.

6. The image transform apparatus according to claim 3, comprising:

a second resolution device which performs wavelet resolution of the brightness image generated by said synthesis device N' times, to generate (3N'+1) pieces of sub band images, the N' being a natural number;

a second transform device which transforms, based on said relation, the brightness impression value of each of the pixels of said sub band images generated by said second resolution device to the luminance value; and a second synthesis device which performs wavelet synthesis of (3N'+1) pieces of sub band images to generate a luminance image, the (3N'+1) pieces of sub band images being having been subjected to the transformation of the brightness impression values to the luminance values by said second transform device.

7. An image transform program for causing a computer to execute:

a resolution step of performing wavelet resolution of a luminance image to generate J pieces of sub band images, the J being an integer equal to two or more;

a transform step of transforming a luminance value of each pixel of said sub band images to a brightness impression value based on a predetermined relation between luminance and brightness impression; and a synthesis step of performing wavelet synthesis of K pieces of sub band images which have been subjected to the transformation of the luminance values to the brightness impression values by said transform step to generate a brightness image, the K being an integer equal to two or more; $K \leq J$.

8. An image transform program for causing a computer to execute:

a resolution step of performing wavelet resolution of a luminance image N times to generate (3N+1) pieces of sub band images, the N being a natural number;

a transform step of transforming a luminance value of each pixel of said sub band images to a brightness impression value based on a predetermined relation between luminance and brightness impression; and a synthesis step of performing wavelet synthesis of (3N+1) pieces of sub band images N times to generate a brightness image, the (3N+1) pieces of sub band images having been subjected to the transformation of the luminance values to the brightness impression values by said transform step.

* * * * *